United States Patent [19]
Elola

[11] 4,065,843
[45] Jan. 3, 1978

[54] BRAKE SHOE RIVET REMOVAL PRESS

[76] Inventor: Alfonso M. Elola, 1758 Highland Blvd., Hayward, Calif. 94542

[21] Appl. No.: 728,980

[22] Filed: Oct. 4, 1976

[51] Int. Cl.² ............................................... B23P 19/04
[52] U.S. Cl. ......................................... 29/252; 29/233
[58] Field of Search ................................... 29/252, 233

[56] References Cited
U.S. PATENT DOCUMENTS

| | | | |
|---|---|---|---|
| 1,717,130 | 6/1929 | Weaver et al. | 29/233 |
| 2,392,251 | 1/1946 | Matthews | 29/252 |
| 2,491,119 | 12/1949 | Lewis | 29/233 |

Primary Examiner—James L. Jones, Jr.
Attorney, Agent, or Firm—Naylor, Neal & Uilkema

[57] ABSTRACT

An hydraulic press for the simultaneous removal of all the brake lining rivets from a brake shoe. The shoe is magnetically retained between the bottom surface of a curved punch retainer and an anvil until the hydraulic system forces the anvil up to clamp the shoe. Hydraulic pressure then automatically forces a curved press against the top ends of spring-loaded drive punches appropriately positioned in the punch retainer so that they move to force the brake lining rivets from the shoe and through the anvil.

9 Claims, 7 Drawing Figures

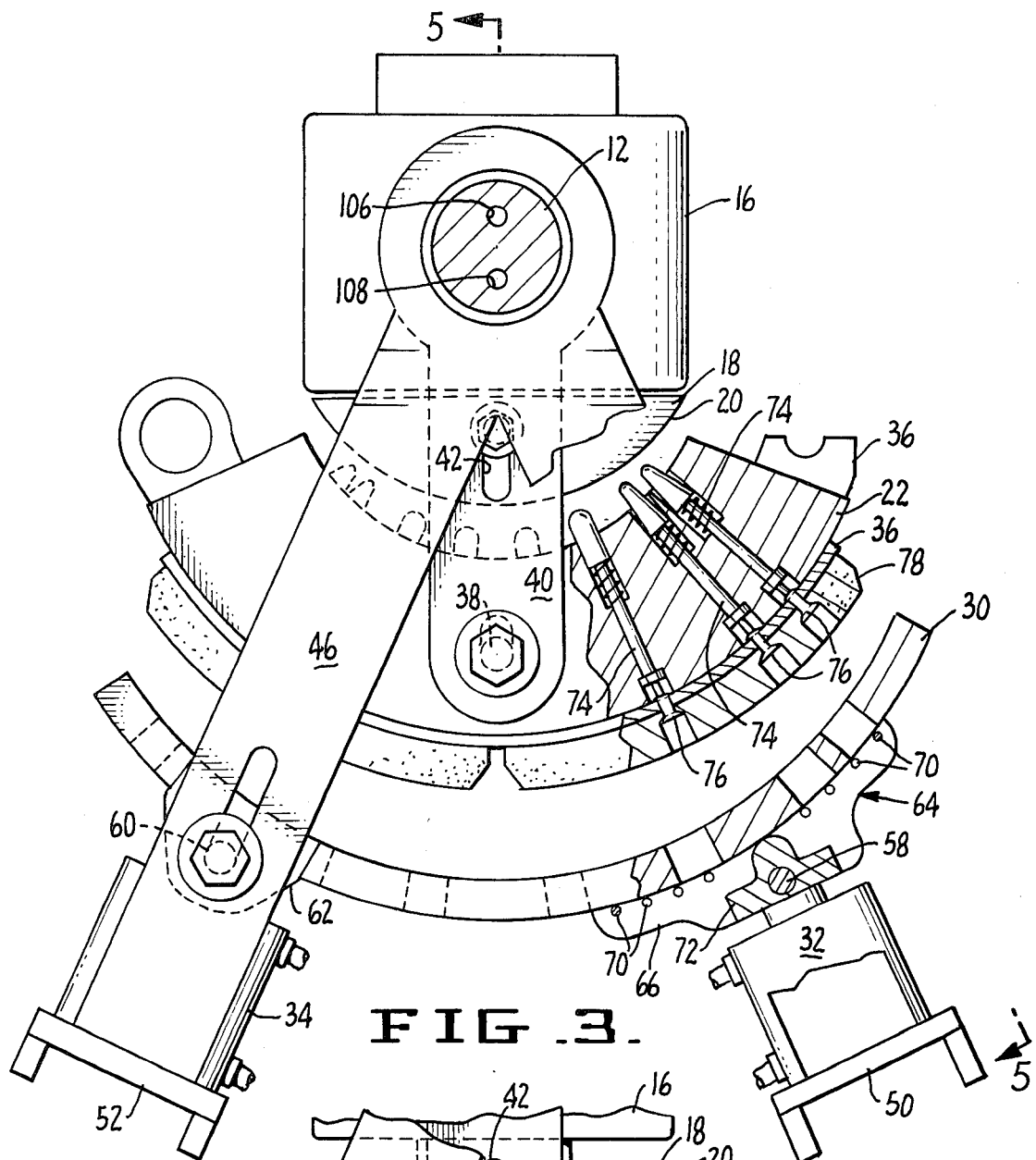

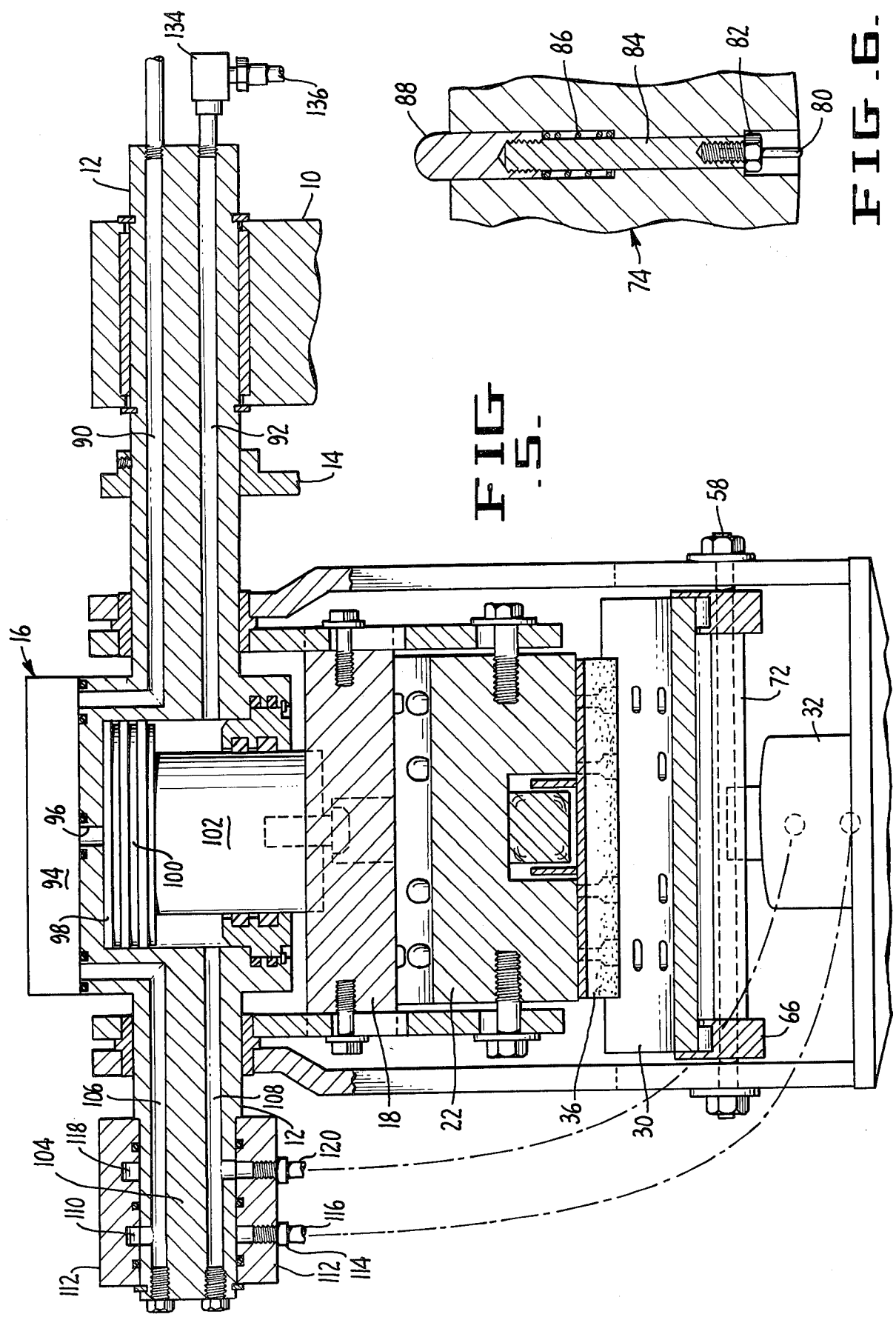

4,065,843

BRAKE SHOE RIVET REMOVAL PRESS

BACKGROUND OF THE INVENTION

This invention relates generally to automotive tooling, and more particularly to an hydraulic press that simultaneously removes all the rivets securing the brake lining to the brake shoe.

The hydraulic machine of the invention would typically be used by automotive brake shops or in any shop that specializes in brake rebuilding and relining. Presently, there are hydraulic presses for simultaneously removing rivets from disc-type brakes, particularly the type used in aircraft service. Because a normal brake shoe has an arcuate surface so that its attached lining will mate with the inner surface of a cylindrical brake drum, lining rivets are generally removed from the shoe, with a foot controlled hydraulic press driving a single punch that is manually positioned to remove only one rivet at a time. While the single punch machine is very economical and acceptable for small brake shops, it is a slow process and not appropriate or efficient for high volume brake relining specialists.

SUMMARY OF THE INVENTION

My brake lining rivet removal press punches out all brake lining rivets in a brake drum, simultaneously. Briefly described, the brake de-liner includes a punch retainer that is curved to receive and magnetically hold a brake shoe and is provided with spring-loaded punches extending through the retainer and positioned over the clinched end of each rivet in the shoe. An anvil curved to mate with the lining on the brake shoe and having clearance holes coaxial with the rivets in the lining is urged into contact with the lining by the application of hydraulic pressure. With the shoe and lining thus clamped between the anvil and the punch retainer, hydraulic pressure is automatically admitted to a cylinder containing a ram that is connected to a press that is urged against the top end of the punches, causing them to force the clinched ends of the rivets through the brake band, the brake lining and, finally, the anvil holes. Reversal of the hydraulic action first lifts the press and then lowers the anvil for easy removal of the separated lining and shoe.

BRIEF DESCRIPTION OF THE DRAWINGS

In the drawings which illustrate the preferred embodiment of the invention:

FIG. 3 is a sectional elevation view of the de-liner illustrating the positions of the spring-loaded punches in the punch retainer, the brake shoe, and the anvil prior to application of hydraulic pressure;

FIG. 4 is a sectional elevation view of the punch retainer, press, and anvil after application of hydraulic pressure;

FIG. 5 is a sectional elevation view taken along the plane designated by Line 5—5 of FIG. 3 and illustrates the punch retainer, the press, and the hydraulic system in the head and swing shaft of the de-liner;

FIG. 6 is a sectional view illustrating the detail of a spring-loaded punch in the punch retainer; and, FIG. 7 is a hydraulic circuit diagram illustrating the flow and hydraulic control for operation of the various cylinders of the brake de-liner.

DESCRIPTION OF THE ILLUSTRATED EMBODIMENT

Figure 1:
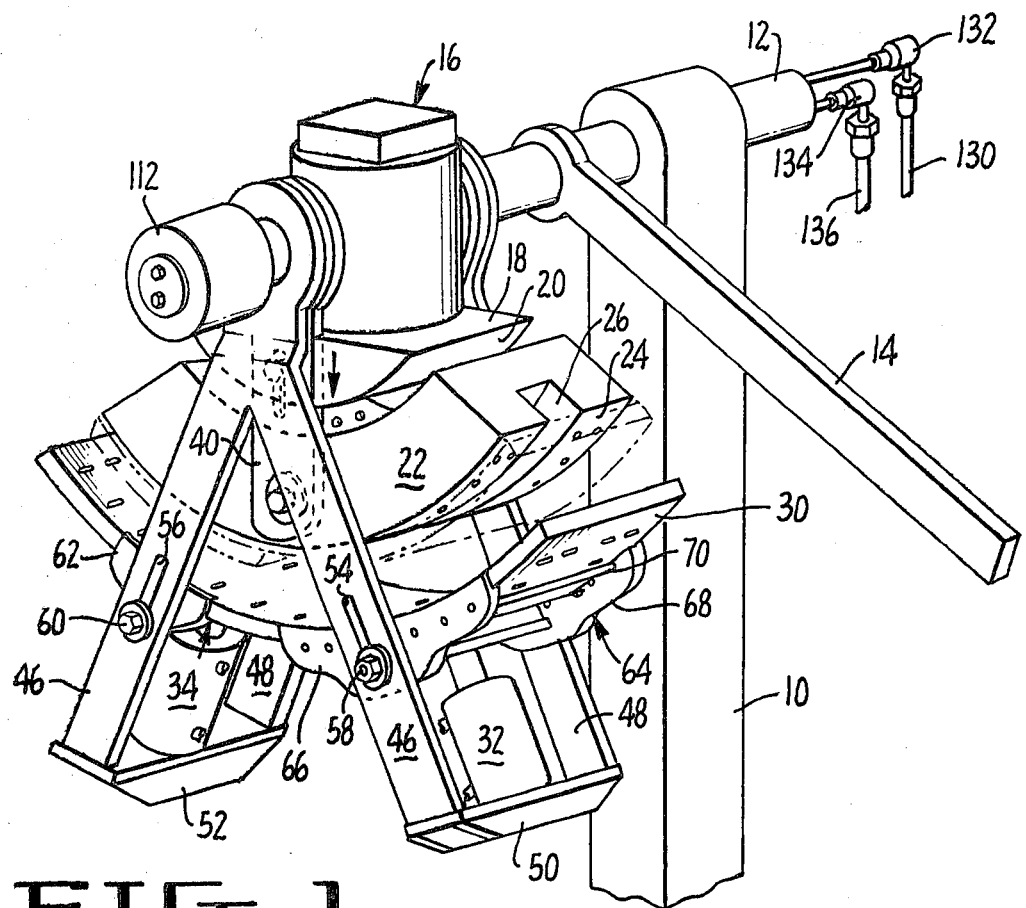
FIG. 1 is a perspective view illustrating the brake shoe rivet removal press of the invention.
Figure 2:
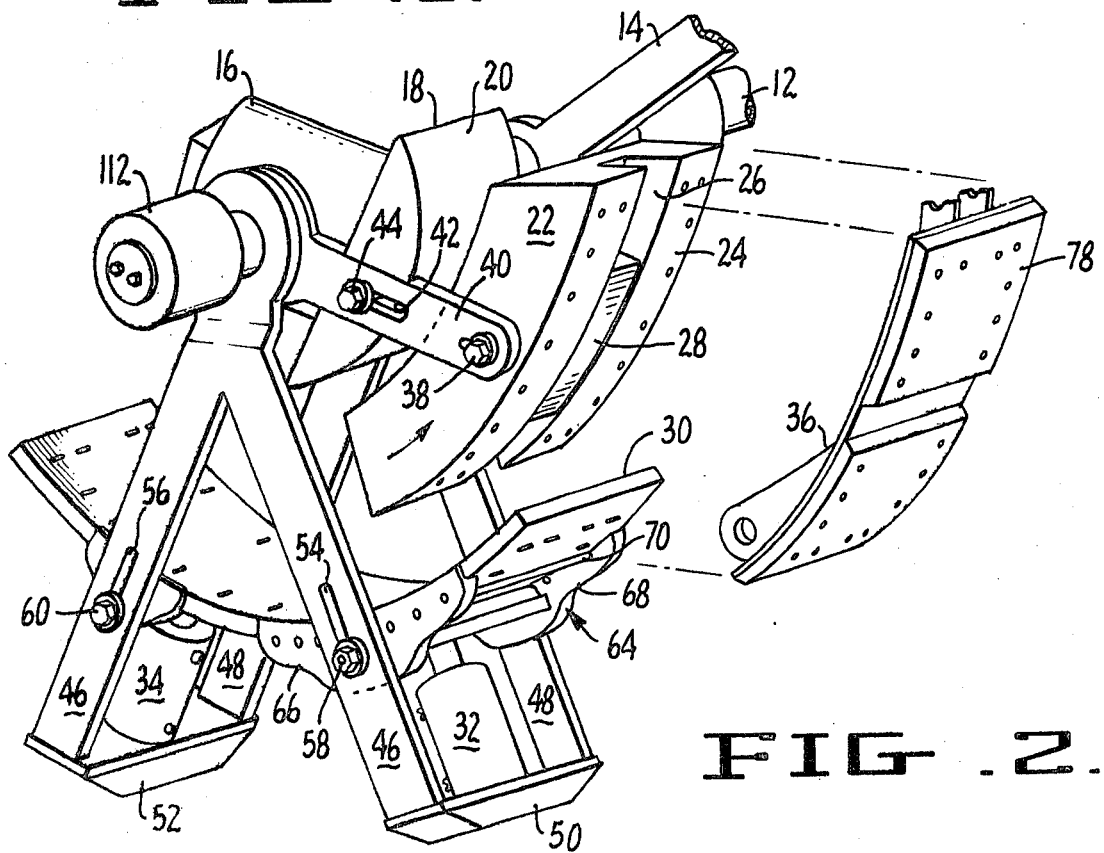
FIG. 2 is a perspective view illustrating the press and punch retainer moved into position for receiving a brake shoe.

Turning now to a detailed description of the preferred embodiment, FIG. 1 is a perspective drawing illustrating the riveted brake shoe press supported by a fixed frame member 10, the top end of which carries a support shaft 12, which is journaled for rotation within the frame member 10. A swing arm 14 is keyed to the shaft 12 so that the machine operator may manually rotate the shaft, as illustrated in FIG. 2. The brake shoe de-liner press is coupled to the end of the support shaft 12 and includes a ram head 16 which, as will be described subsequently, contains a hydraulic ram that is coupled to a press 18 which, as illustrated, has an arcuate pressing surface 20 designed to mate with the upper concave arcuate surface of a brake shoe holder and punch retainer 22. Punch retainer 22 has an arcuate lower surface 24 and, as best illustrated in FIG. 2, the surface 24 contains a longitudinal slot adapted to carry the mounting bracket of a riveted brake shoe so that the brake band with the attached lining will overlie the arcuate lower surface 24. Positioned within slot 26 is a magnet 28 which is provided to retain the brake shoe in position in the slot 26 until the shoe can be firmly clamped between the surface 24 and an anvil 30 which, as will be explained subsequently, is forced upward against the brake lining by the action of clamping rams 32 and 34.

As shown in FIG. 2, the brake shoe holder and punch retaining member 22 are rotated along with the ram head 16 and press 18 to facilitate attaching and detaching the brake shoe 36. The punch retainer 22 is loosely mounted by bolts 38 in a longitudinal slot in a punch retainer support arm 40 which is keyed to the support shaft 12 for movement by swing arm 14. Loosely coupled in a second slot 42 is a bolt 44 which is threaded into the side wall of the press 18 to prevent rotation of the press during operation of the machine.

Loosely journaled to the support shaft are anvil support members 46 and 48, each of which is an inverted V-shaped member with its apex journaled to the shaft 12 and its ends connected together by arch bars 50 and 52 which support clamping rams 32 and 34, respectively. Each of the arms of the anvil support members 46 and 48 contain longitudinal slots 54 and 56 which carry rods 58 and 60, respectively, that lie beneath the anvil 30 and loosely couple together the adjacent arms of the anvil support members 46 and 48. Each end of rods 58 and 60 is threaded and provided with a washer and nut that is sufficiently loose to permit the anvil 30 to rise along with the rods 58 and 60 in the slots 54, 56.

As illustrated in FIG. 3, the rod 60 that rides in slot 58 is coupled through a hole in a metallic ear 62 that is welded to form a portion of the anvil 30. Thus, as the clamping ram 34 is raised and lowered, the rod 60 moves upward along the center line of the arm of the anvil support 46, thus drawing the anvil 30 along a path parallel to the center line of the longitudinal slot 56. The clamping ram 32, on the other hand, drives against rod 58 which extends through a hole in a roller cradle assembly 64. The assembly 64 includes bearing support plates 66 and 68 which lie parallel to and in contact with the inner surface of the adjacent arms of the anvil support members 46 and 48. Bridging the space between the support plates 66 and 68 are a plurality of rollers 70 that are mounted in an arcuate pattern and which support the bottom surface of the anvil 30 which is in rolling contact therewith. Also bridging the distance between the plates 66 and 68 is a structural member 72 which bears across the bottom surface of the anvil 30 and evenly distributes thereto the force exerted by the clamping ram 32.

Illustrated in FIGS. 3 and 4 are sectional views of the punch retaining member 22 illustrating the mounting of the spring-loaded punches 74 that drive out the rivets 76 that attach the brake lining 78 to the brake shoe 36. As best illustrated in the sectional view in FIG. 6, the punch assembly 74 includes the rivet punch element 80 which is threaded by an attached hex nut 82 into a rod 84 that extends through a hole in the punch retaining member 22. The hole through the retainer 22 is counterbored into its arcuate lower surface 24 to receive the nut 82 and is likewise counterbored on its top surface to receive a compression spring 86 and a tappet 88 which is screwed onto the threaded top end of the rod 84 and which retains spring 86 within the counterbored hole. As illustrated in FIGS. 3 and 4, tappets 88 extend from the upper surface of the retaining member 22 so that, in operation, the press 20 will lower to contact the tappets 88 and drive the punches 74 for the removal of the rivets 76.

The punches 74 positioned in the punch retaining member 22 simultaneously drive all rivets from a riveted brake shoe. Accordingly, it is necessary that the location of punches 74 must correspond to the location of the rivets in the shoe and also that the back-up holes in the anvil 30 are correspondingly located. It is apparent that whenever it is desired to "tool-up" for a different type of brake shoe, it is only necessary to remove the punch retainer 22 and anvil 30 and replace them with punch retainer and anvil appropriate to accommodate the new brake shoe.

FIG. 5 is a frontal sectional view taken along the plane designated by Line 5—5 of FIG. 3 and illustrates the details of the hydraulic components of the machine. As shown in the drawing, the support shaft 12 is bored to provide two hydraulic conduits 90 and 92 through which the hydraulic fluid circulates. The conduit 90 passes through the shaft 12 and into a pilot operated check valve 94 which, when opened by the application of a high hydraulic pressure to the pilot member of the valve 94, will admit the high pressure hydraulic fluid through the cylinder port 96 and into the top of the cylinder 98, resulting in a downward force of the piston 100 and its attached pressure ram 102. The hydraulic conduit 92 is coupled directly from the external hydraulic system into the area of the cylinder below the piston 100. Thus, when hydraulic pressure is applied through conduit 90 to force down the ram 102, hydraulic fluid remaining in the area below the piston is expelled through the conduit 92. Similarly, when it is desired to lift the ram 102, pressure is applied through conduit 92 and the hydraulic fluid is forced out through the conduit 90.

The outboard end 104 of the support shaft 12 is provided with hydraulic conduits 106 and 108. One end of conduit 106 is coupled directly to the hydraulic conduit 90 within the ram head 16 and the opposite end of conduit 106 terminates in a radial hole in the shaft 12 that opens into an internal annular slot 110 in the swivel coupling 112 which is mounted to the outboard end 104 of the shaft 12 so that it may swivel on the shaft when the shaft 12 is rotated by the swing arm 14 to the position shown in FIG. 2. As illustrated in FIG. 5, an hydraulic hose connector 114 is threaded into a radial hole entering the annular slot 110 and the attached hydraulic hose 116 couples the connector 114 to the high pressure input ports on each of the clamping rams 32 and 34.

Similarly, the hydraulic conduit 108 in the outboard end of the support shaft 12 connects between the area in the cylinder around the pressure ram 102 and below the piston 100 and an annular slot 118 in the swivel coupling 112. Annular slot 118 is connected through a high pressure hydraulic hose 120 to the low pressure ports in each of the clamping rams 32 and 34.

Figure 7:
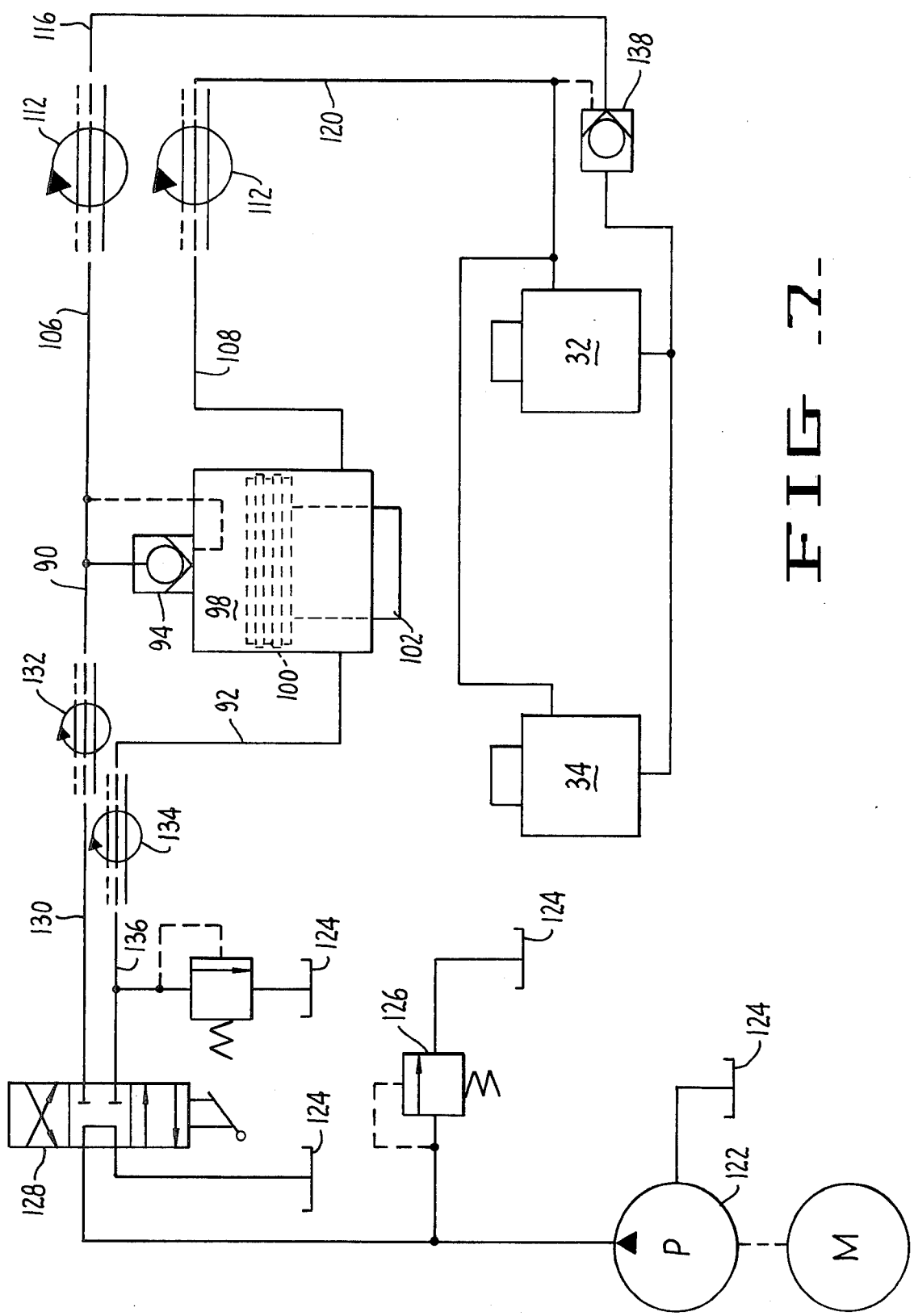

FIG. 7 is a block schematic diagram illustrating the operation of the hydraulic system. External to the brake shoe de-liner, and not forming a part of the invention, is a hydraulic pressure source including a motor-driven hydraulic pump 122 that draws fluid from a sump 124 that contains a supply of hydraulic fluid at atmospheric pressure. The high pressure output of pump 122 is provided with a necessary high pressure relief valve 126 and the fluid under pressure is directed into a three-position, self-centering, manually operated valve 128. In its center, or neutral position, fluid is prevented from entering the hydraulic conduits of the press and is by-passed directly back into the sump 124. In one of its actuated positions, valve 128 directs the high pressure hydraulic fluid through an hydraulic hose 130 to a swivel coupler 132 which is coupled to the hydraulic conduit 90 in support shaft 12, as is illustrated in FIG. 1. While the valve is in this first position, hydraulic fluid being expelled from the machine through hydraulic conduit 92 passes through the swivel coupler 134, the hydraulic hose 136, the valve 128 and into the sump 124. In the second actuating position of the valve 128, the input paths are reversed and the high pressure hydraulic fluid is directed into the hose 136 while the expelled fluid passes through the hose 130 into the sump 124.

When the valve 128 is in the appropriate position to apply high-pressure fluid through the hose 130, the fluid passes through the swivel coupler 132 and into the conduit 90 where, as previously mentioned, it is applied to the pilot operated check valve 94 which blocks its passage into the cylinder 98. The fluid then passes through the conduit 106 in the outboard end of shaft 12, through the swivel coupler 112 and hydraulic hose 116, and through a pilot operated check valve 138 to the clamping rams 32 and 34. The application of the hydraulic pressure to rams 32 and 34 creates an upward force against the anvil 30 to clamp the brake shoe 36 between anvil 30 and the punch retainer member 22, as shown in FIGS. 3 and 4. When the brake shoe is thus clamped, the pressure within the hose 116 and conduit 106 will rise to the point where the pilot-operated check valve 94 in the ram head 16 will force the valve open to admit the high pressure hydraulic fluid into the cylinder port 96 and the cylinder 98, as shown in FIG. 5. The application of the high hydraulic pressure to the piston 100 then actuates the ram 102 and the press 18 to drive all the rivets from the brake shoe 36.

The external, manually-operated valve 128 is then reversed to apply the hydraulic fluid through the conduit 92 in the shaft 12 and all pressure is released from the previously actuated members associated with the conduit 90. As shown in FIG. 5, pressure applied through conduit 92 enters the cylinder 98 below the piston 100 and, thence, flows through the conduit 108, hose 120, and into the areas of the clamping rams 32 and 34 that forces the double acting cylinders therein to lower into their ambient position. It will be noted from FIG. 7, however, that the pilot-operated check valve 138 prevents the previously high pressure fluid in rams 32 and 34 from being driven out through the hose 116. Therefore, the high pressure applied through conduit 92 in the shaft 12 must first lift the pressure ram 102, at which point, the pressure within the conduit 92, the conduit 108 and the hose 120 will rise to the point where check valve 138 will open to permit the fluid to be driven out, thereby permitting the pressure in hose 120 to lower the clamping rams 32 and 34.

It is apparent, therefore, that the application of pressure to the hydraulic system of the invention will, in the first position, cause an actuation of the clamping rams 32 and 34 prior to the actuation of ram 102. When the external valve is reversed, ram 102 is lifted before the double acting cylinders within the clamping rams 32 and 34 are released to permit the removal of the brake shoe.

Conclusion

It should be understood that the invention is not intended to be limited to the specifics of the illustrated embodiment, but rather is defined by the accompanying claims.

I claim:

1. A press for the simultaneous removal of the lining attaching rivet of a brake shoe, said press comprising: an anvil for receipt of said brake shoe, said anvil having an arcuate surface shaped for conforming engagement with one side of a brake shoe received therein and a plurality of holes disposed for alignment with the lining attaching rivets of said brake shoe; a punch retaining member disposed in opposition to the anvil and having an arcuate surface shaped for conforming engagement with the side of a brake shoe received on said anvil opposite the side of said shoe engaged with the anvil; a plurality of rivet punches positioned for movement within holes in said punch retaining member, each of said punches having a punch end adjacent the arcuate surface of said member for movement therethrough, said punch ends being positioned so as to be simultaneously alignable with the lining attaching rivets of a brake shoe engaged between the anvil and member; clamping means for imparting relative movement to the anvil and retaining member to clamp said brake shoe therebetween with the openings of the anvil in alignment with the punch ends of the punches and the lining attaching rivets of the shoe in aligned interposed relationship between said aligned openings and punch ends; pressing means for applying a force against the punches to simultaneously drive said plurality of punches through the holes in said anvil and into engagement with the lining attaching rivets of a brake shoe aligned with said holes to drive the rivets into the holes of the anvil aligned therewith.

2. A press, according to claim 1, wherein said punches include extensions extending through the side of said member opposite the arcuate side thereof and the pressing means comprises an hydraulic ram disposed for simultaneous engagement with the extensions.

3. A press, according to claim 2, further including a stationary frame member, a rotatable shaft horizontally journaled on said frame member, and a manually operable arm attached to said shaft, and wherein said hydraulic ram press and punch retaining member are coupled to said shaft for rotation therewith by said manually operable arm.

4. A press, according to claim 3, wherein said clamping means comprises at least one hydraulic clamping cylinder coupled between the anvil and an anvil support member journaled to said rotatable shaft.

5. A press, according to claim 4, wherein said anvil support member comprises a pair of inverted V-shaped frames positioned perpendicular to said rotatable shaft, the apex of each frame being journaled to said shaft, the opposite leg end of one frame being connected to the corresponding leg end of the other frame by a structural member, each supporting member supporting an hydraulic clamping cylinder.

6. A press, according to claim 4, wherein said rotatable shaft contains first and second hydraulic conduits within said shaft, said first conduit extends from the first end of said shaft to one side of a piston within said ram and said second conduit extends from the first end of said shaft to the opposite side of said piston.

7. A press, according to claim 6, wherein said first and second hydraulic conduits extend from said ram to the second end of said shaft and are coupled by hydraulic hose to said hydraulic clamping cylinders.

8. A press, according to claim 7, further including a pilot operated check valve interposed between said first hydraulic conduit and said ram, said check valve preventing the entrance of hydraulic fluid into said ram until said clamping cylinders have been extended and the hydraulic pressure within said first conduit has reached a predetermined level.

9. A press, according to claim 8, further including an hydraulic swivel coupler mounted for rotation on the second end of said rotatable shaft, said swivel coupler having a tubular bore fitted onto said shaft, said bore having two annular slots each communicating with an hydraulic hose extending to said hydraulic clamping cylinder, and each slot communicating with an hydraulic conduit in said shaft.

* * * * *